(12) United States Patent
Behzadi et al.

(10) Patent No.: US 11,995,253 B1
(45) Date of Patent: May 28, 2024

(54) SYSTEMS WITH DEPLOYABLE CONTROLLERS AND USER IDENTIFICATION

(71) Applicant: Apple Inc., Cupertino, CA (US)

(72) Inventors: Arian Behzadi, San Francisco, CA (US); Jeffrey A Sewell, Wyandotte, MI (US); Andrew W Kooker, San Francisco, CA (US); Kurt R Stiehl, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/297,539

(22) Filed: Apr. 7, 2023

Related U.S. Application Data

(60) Provisional application No. 63/355,925, filed on Jun. 27, 2022.

(51) Int. Cl.
| | | |
|---|---|---|
| *G06F 3/0362* | (2013.01) | |
| *G01S 7/481* | (2006.01) | |
| *G01S 17/08* | (2006.01) | |
| *G06F 3/0354* | (2013.01) | |

(52) U.S. Cl.
CPC .......... *G06F 3/0362* (2013.01); *G01S 7/4815* (2013.01); *G01S 17/08* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 10,410,319 B2 * | 9/2019 | Wunderlich | ........... B60K 35/00 |
| 10,732,737 B2 | 8/2020 | You et al. | |
| 2008/0036580 A1 * | 2/2008 | Breed | .................. G06V 20/593 |
| | | | 340/438 |
| 2017/0255280 A1 | 9/2017 | Pacsai et al. | |
| 2018/0170182 A1 | 6/2018 | Choi | |
| 2018/0373350 A1 | 12/2018 | Rao et al. | |

* cited by examiner

*Primary Examiner* — Stephen T. Reed
(74) *Attorney, Agent, or Firm* — Treyz Law Group, P.C.; G. Victor Treyz; Kendall P. Woodruff

(57) ABSTRACT

A controller may have an input device and a sensor adjacent to the input device. The input device may be a touch sensor, a touch screen display, a button, a rotatable knob, or other device that gathers user input. The input device may be reachable by different users occupying different respective seats. The sensor may be an infrared optical sensor that emits infrared light and measures the emitted infrared light after the emitted infrared light has reflected from the hand of a user. The sensor may determine from these hand measurements which of the different users is supplying user input to the input device. Hand distance information and other information on the current user of the input device may also be gathered. The input device may be deployed by an actuator based on hand speed information.

20 Claims, 6 Drawing Sheets

US 11,995,253 B1

SYSTEMS WITH DEPLOYABLE CONTROLLERS AND USER IDENTIFICATION

This application claims the benefit of provisional patent application No. 63/355,925, filed Jun. 27, 2022, which is hereby incorporated by reference herein in its entirety.

FIELD

This relates generally to systems with adjustable components, and, more particularly, controls for such systems.

BACKGROUND

Homes, offices, commercial facilities such as restaurants, theaters, and other venues, mobile systems, and other systems have lighting, air-conditioning, adjustable seating, and adjustable components that perform other functions. System users can use buttons and other controls to adjust the operation of these components.

SUMMARY

A controller in a system may have an input device and a sensor adjacent to the input device. The input device may be a touch sensor, a touch screen display, a button, a rotatable knob, or other device that gathers user input. The input device may be adjusted to control system operations such as operations associated with heating and air-conditioning, lighting, media playback, adjustable seat settings (e.g., seat tilt, lumbar support), etc.

The input device may be reachable by different users in different respective positions (e.g., different seating positions). The sensor may be an infrared optical sensor that emits infrared light and measures the emitted infrared light after the emitted infrared light has reflected from the hand of a user. The sensor may determine from these hand measurements which of the different users is supplying user input to the input device. This allows the operation of the input device in the controller to be customized for the user who is currently supplying user input to the input device. For example, if the sensor gathers user position information indicating that a user in a first position on the right side of a system is using the controller, the controller can adjust the lighting for the right-side user without making any changes to the lighting for an adjacent left-side user.

If desired, hand-to-controller distance information and other information on the current user of the controller may also be gathered. The input device may be deployed by an actuator based on hand speed information.

DETAILED DESCRIPTION

A system such as a building for an office, home, restaurant, theater, or other venue or a mobile system may have controls. Controls may be provided to adjust interior and exterior lighting, climate control functions, media access functions, adjustable seating functions (e.g., seat tilt, etc.) and other functions. In an illustrative arrangement, which is described herein as an example, a system is provided with a controller having an associated sensor that identifies which of multiple seat occupants (sometimes referred to as users) is using the controller. This allows the controller to be shared. When the controller is being manipulated, system adjustments can be made that are specific to the current user of the controller. For example, if the controller is used to adjust lighting, the lighting associated with the current user of the controller can be adjusted while the lighting for other system users can remain unchanged.

The controller may have an input device such as a rotary knob or other input device. If desired, the controller may have an input device that is deployed as a user reaches for the controller.

Figure 1:
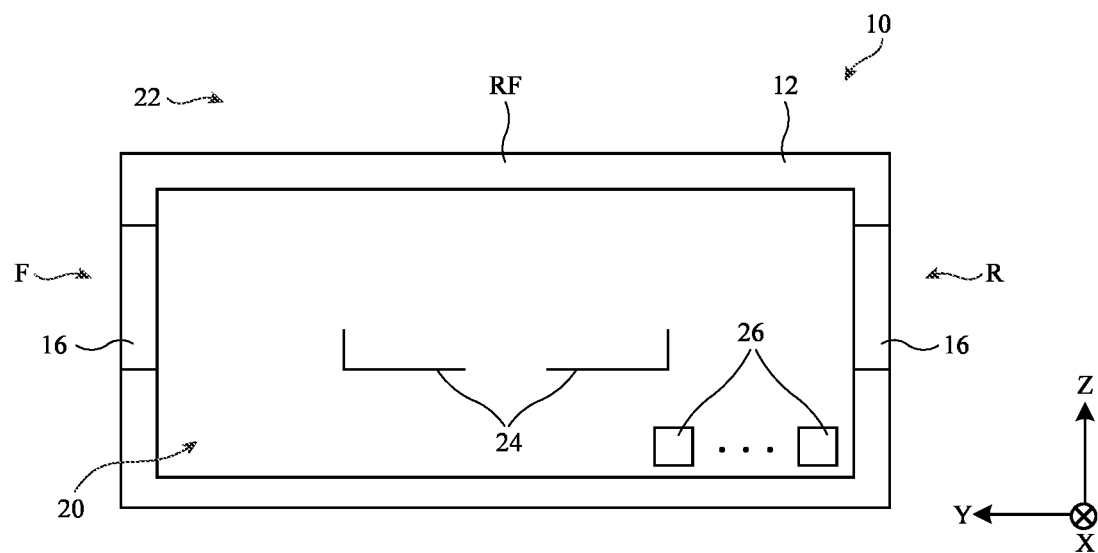
FIG. 1 is a side view of an illustrative system in accordance with an embodiment.

FIG. 1 is a side view of a portion of an illustrative system that may be provided with one or more controllers. The system of FIG. 1 may be a building such as an office building, a home, a restaurant, a theater, another structure with seating, or a mobile system. During use of the system, a controller can use its input device to receive user input. This user input can be used to adjust system components. For example, in a scenario in which the input device is a rotary knob, knob input from the knob can be used to adjust the intensity of light that is output from lighting, may be used to adjust the temperature of an air conditioning system, may be used to adjust the volume of audio that is output from speaker, may be used to adjust the amount that an adjustable seat is tilted, and/or may be used to make other system component adjustments.

The system may have components that are specific to particular users and that users therefore desire to control individually. For example, in a theater, each user may sit in a different respective adjustable seat. Each user desires to adjust their seat separately to optimize the seat for their own comfort. Similarly, users may wish to independently adjust user-specific components such as user-specific task lighting, user-specific speakers in an audio system, user-specific fan settings in an air-conditioning system, etc.

To allow users of the system of FIG. 1 to make individual adjustments without using separate controllers, a controller can be shared between multiple users in multiple respective user positions (e.g., users sitting in adjacent seats). The shared controller uses a sensor that identifies the position (and therefore the seat location) of the current user who is manipulating the controller's knob (or other input device). In this way, the controller can be shared between multiple users, while still supporting the ability for each user to make adjustments to user-specific system components. Because the controller can be shared by adjacent users in adjacent seats, the controller may be used in systems where space is at a premium (e.g., a small room, the interior of a mobile system such as a vehicle, etc.). Configurations in which the controller is being used in a confined space such as a mobile system (e.g., a vehicle) are described herein as an example. In general, the controller may be used in any system with multiple users (e.g., systems with multiple users in multiple respective positions such as multiple respective seating positions).

The illustrative system of FIG. 1 is a vehicle. Vehicle 10 of FIG. 1 may be the type of vehicle that carries passengers (e.g., an automobile, truck, or other automotive vehicle).

Vehicle 10 may be manually driven (e.g., by a human driver), may be operated via remote control, and/or may be autonomously operated (e.g., by an autonomous vehicle driving system implemented using the control circuitry, sensors, and other components of vehicle 10). If desired, a vehicle driving system (e.g., a computer-assisted driving system that is also optionally used to support fully autonomous driving) may be used to provide vehicle driving assistance functions while vehicle 10 is being driven under manual control.

Vehicle 10 may include a body such as body 12. Body 12 may include vehicle structures such as body panels formed from metal and/or other materials, may include doors, a hood, a trunk, fenders, a chassis to which wheels are mounted, a roof, etc. In non-vehicle systems, body 12 may include building structures such as walls enclosing interior regions such as rooms. Windows 16 may be formed in doors (e.g., on the sides of vehicle body 12, on roof RF of vehicle 10, at front F and/or rear R of vehicle 10, and/or in other portions of vehicle 10). Windows 16, doors, and other portions of body 12 may separate interior region 20 of vehicle 10 from the exterior environment that is surrounding vehicle 10 (exterior region 22).

Vehicle 10 may have seating such as seats 24 in interior region 20. Seats 24 may include bucket seats, bench seats, and/or other seats on which vehicle occupants may sit. These seats may include forward-facing seats and/or rear-facing seats. In the example of FIG. 1, seats 24 include a pair of face-to-face seats 24 in which first and second seats 24 face each other. In general, seats 24 may be oriented so that one or more users face forward as vehicle 10 is driven forward and so that one or more users face rearward as vehicle 10 is driven forward. Right and left seat occupants may sit adjacent to each other on each seat 24 or each seat 24 may accommodate more passengers or fewer passengers. Arrangements in which the seats of vehicle 10 face to the side, in which all seats 24 face forward, in which seats 24 may be rotated between forward and rearward orientations and/or other orientations, and/or in which seats 24 of vehicle 10 have other configurations may also be used. The example of FIG. 1 in which the interior of vehicle 10 contains one or more rearward-facing bucket seats and/or bench seats and one or more forward-facing bucket seats and/or bench seats is illustrative.

Vehicle 10 may be provided with one or more input-output components. These components may include displays, speakers, buttons, sensors that gather user input, and other components. The input-output components may include controllers for gathering user input to adjust vehicle operations. The controllers may include controllers for receiving user steering commands, for receiving user navigation commands for an autonomous driving system, for receiving user input to adjust lighting, media playback, heating and air-conditioning, and other vehicle operations, and for receiving other user input. In an illustrative configuration, vehicle 10 includes at least one controller that has a sensor that monitors interactions with vehicle occupants (sometimes referred to as seat occupants or users). The sensor may, as an example, identify which of multiple users is reaching for and interacting with the controller.

Vehicle 10 may include components 26. Components 26 may include a steering and propulsion system (e.g., a computer-controlled driving system implemented using control circuitry in vehicle 10 that operates under manual control from a user and/or that serves as an autonomous driving system that operates autonomously). The steering and propulsion system (sometimes referred to as the driving system) includes wheels coupled to body 12, steering actuators coupled to the wheels to turn the wheels, one or more motors for driving the wheels, and other vehicle systems.

Components 26 may include control circuitry and input-output devices. Control circuitry in components 26 may be configured to operate vehicle systems such as the steering and propulsion system based on user input, to operate vehicle systems such as the steering and propulsion system autonomously in connection with running an autonomous driving application, to run a navigation application (e.g., an application for displaying maps on a display), to run software for controlling vehicle climate control devices, lighting, media playback, window movement, door operations, sensor operations, and/or other vehicle operations, and to support the operation of other vehicle functions. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid state drives), one or more removable flash drives or other removable media, or other storage. Software stored on the non-transitory computer readable storage media may be executed on the processing circuitry of components 26. The processing circuitry may include application-specific integrated circuits with processing circuitry, one or more microprocessors, a central processing unit (CPU) or other processing circuitry.

The input-output components (input-output devices) of components 26 may include displays, sensors, buttons, light-emitting diodes and other light-emitting devices, haptic devices, speakers, and/or other devices for gathering environmental measurements, information on vehicle operations, and/or user input. The sensors in components 26 may include ambient light sensors, touch sensors, force sensors, proximity sensors, optical sensors such as cameras operating at visible, infrared, and/or ultraviolet wavelengths (e.g., fisheye cameras and/or other cameras), capacitive sensors, resistive sensors, ultrasonic sensors (e.g., ultrasonic distance sensors), microphones, three-dimensional and/or two-dimensional images sensors, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors. Output devices in components 26 may be used to provide vehicle occupants and others with haptic output (e.g., force feedback, vibrations, etc.), audio output, visual output (e.g., displayed content, light, etc.), and/or other suitable output.

Figure 2:
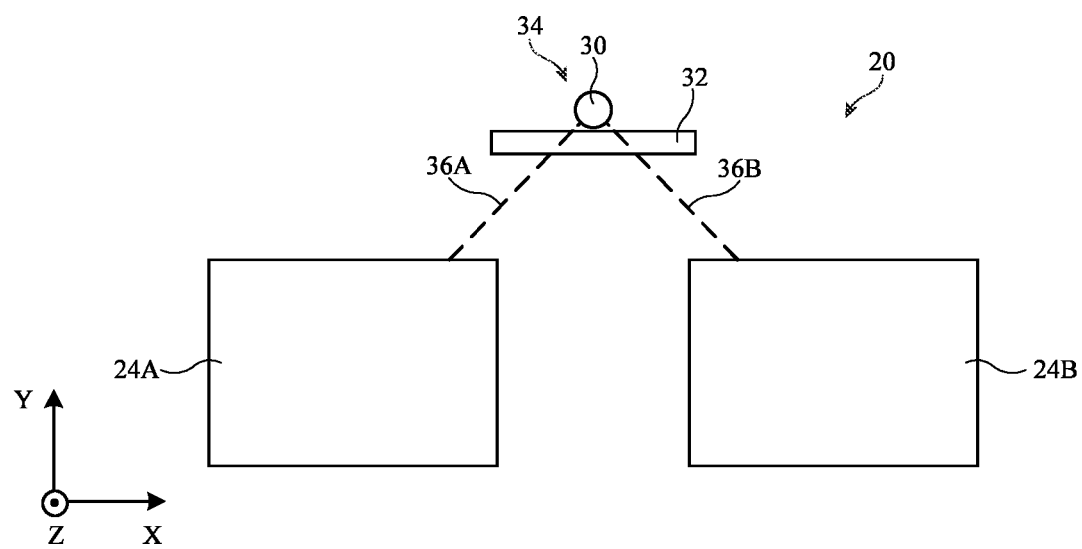
FIG. 2 is a top view of an illustrative controller having an input device and associated sensor for determining which seat occupant is currently using the input device in accordance with an embodiment.

FIG. 2 is a top view of a portion of interior region 20 showing how multiple users may share a controller. As shown in FIG. 2, vehicle 10 may include seating (a bench seat with two seating positions, adjacent bucket seats, etc.) with multiple seating positions such as left seat 24A and right seat 24B. Left and right users may respectively occupy these seats. Controller 34 may be located within reach of both of the users while the users are seated in seats 24A and 24B. For example, controller 34 may be reachable by both the left seat occupant and the right seat occupant. To be reachable by seat occupants, controller 34 is preferably within 1 m of the chests of the seat occupants and therefore within 1 m of both left seat 24A and right seat 24B. This allows seat occupants with a typical arm length of about 1 m to manipulate controller 34 with their fingers. If desired, controller 34 may be located at a different distance from seats 24A and 24B to be reachable (e.g., within 1.5 m, within 1.2 m, within 0.8 m, within 0.5 m, etc.). Controller 34 may include an input-output device such as device 30 and sensor 32. Device 30 may be a knob or other device for gathering user input. Sensor 32, which may sometimes be referred to as a user identity sensor or seat occupant identity sensor, may be used to determine which user (the left or right seat occupant in this scenario) is currently using sensor 30. This allows controller 34 to be shared between the left and right users.

Consider, as an example, a scenario in which components 26 include a left interior light that illuminates seat 24A and a right interior light that illuminates seat 24B. Sensor 32 may be an optical sensor such as an infrared optical sensor that emits light and detects light reflected from users' hands. During operation, sensor 32 can determine whether the left user or the right user is reaching out to operate device 30. When the left user is using device 30, the left user's hand (and arm) will be outstretched along path 36A of FIG. 2 and will be detected by sensor 32 as being located to the left of device 30. When, however, the right user is using device 30, sensor 32 will detect that the right user's hand (and arm) are outstretched along a different path (path 36B of FIG. 2).

Because sensor 32 can determine which user is manipulating (or about to manipulate) device 30, the actions taken by controller 34 can be individualized based on the detected identity of the current user of controller 34. When it is determined that the left user is using device 30, user input to device 30 can be used to adjust vehicle settings associated with the left user, whereas when it is determined that the right user is using device 30, the user input received by device 30 can be used to adjust vehicle settings associated with the right user.

In the present example, adjustments to device 30 to adjusting the interior illumination of vehicle 10 can be personalized. If the left user makes a lighting adjustment with device 30, the amount of light being output from the left interior light may be adjusted without adjusting the amount of light being output from the right interior light. If the right user makes a lighting adjustment with device 30, the right interior light may be adjusted without adjusting the left interior light. Personalized (user-specific) adjustments to other vehicle settings may also be made using controller 34. As an example, vehicle 10 may include separately adjustable left speakers and right speakers and controller 34 may make volume adjustments to the speaker associated with the currently active user of controller 34. Vehicle 10 may also allow individualized adjustments to be made to the positions of seats 24A and 24B, may allow customized lists of media to be displayed for each user, may allow customized adjustments to user-specific heating and air-conditioning components (e.g., by adjusting left user's climate control system or the right user's climate control system), and/or may allow other individualized adjustments to be made to the components of vehicle 10.

Figure 3:
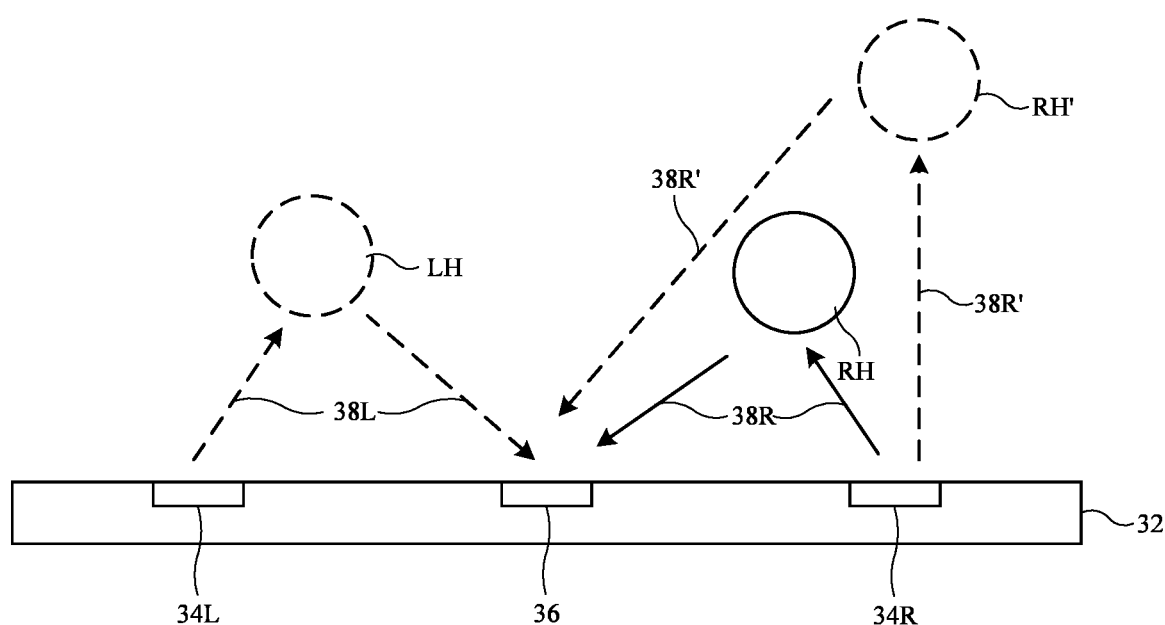
FIG. 3 is a side view of an illustrative optical sensor for detecting users' hands and thereby monitoring user interactions with a controller in accordance with an embodiment.

Sensor 32 may be a capacitive sensor (e.g., a capacitive sensor that can detect hand movements at a distance), may be an optical sensor (e.g., an image sensing system having one or more cameras), may be an infrared optical sensor with one or more light emitters and one or more light detectors configured to make spatial measurements on nearby objects, and/or may be any other type of sensor that may detect user body parts as the users interact with device 30. In an illustrative configuration, which is shown in FIG. 3, sensor 32 has one or more light sources such as left light source 34L and right light source 34R. Light sources 34L and 34R may each include one or more light-emitting devices such as light-emitting diodes and/or lasers. In an illustrative configuration, light sources 24L and 34R emit infrared light (e.g., light sources 34L and 34R may each include one or more infrared light-emitting diodes and/or one or more infrared lasers that emit infrared light). The infrared light may be emitted upwardly so that when the users' hands pass along paths such as paths 36A and 36B, the hands will be illuminated by the infrared light. Reflected infrared light from the users' hands may be detected by photodetector 36 (e.g., a photodiode, a phototransistor, or other photosensor).

In this type of arrangement, sensor 32 may illuminate light sources 34L and 34R separately (e.g., in alternation with a period of ten ms or other suitable alternation rate) to allow sensor 32 to distinguish between the presence of the left user's hand over the left portion of sensor 32 and the presence of the right user's hand over the right portion of sensor 32. When operated in alternation, light source 34L is turned on while light source 34R is turned off and then light source 34L is turned off while light source 34R is turned on. This process continues so that only a single light source is on at any time (e.g., light source 34L is on, then light source 34R is on, then light source 34L is on, then light source 34R is on, and so forth) while the photodetector of sensor 32 is gathering hand reflection measurements.

Light source 34L and light source 34R are never turned on together, so at any given time only light source 34L or light source 34R is active. In a typical scenario, the periods of time for which light sources 34L and 34R are activated are of the same length. For example, light source 34L may be turned on for 10 ms and then light source 34R may be turned on for 10 ms and so on for the duration of the sensing operations of sensor 32. Arrangements in which light sources 34L and 34R are turned on and off for periods of time that differ from each other may also be used.

In an illustrative embodiment, light sources 34L and 34R activate in alternation with a frequency of 10 Hz to 1 MHz. If desired, the frequency with which sources 34L and 34R are turned on and off may also be at least 1 Hz, at least 5 Hz, at least 10 Hz, at least 30 Hz, at least 100 Hz, at least 1 kHz, at least 10 kHz, at least 100 kHz, less than 10 MHz, less than 1 MHz, less than 100 kHz, less than 10 kHz, less than 1 kHz, less than 100 Hz, or other suitable frequency.

As shown in FIG. 3, when light source 34R is active, righthand light 38R is produced, which will reflect from the hand of the right user (right hand RH) and will be subsequently detected by photodetector 36. The distance of the user's right hand from sensor 32 (and therefore from device 30) can be determined by measuring the intensity of light 38R at photodetector 36. If the user's hand is close, the signal at photodetector 36 will be relatively high. If the user's hand is farther (see, e.g., hand position RH'), light 38R' will still reflect from the right user's hand to photodetector 36, but will be weaker due to the larger distance of the hand to sensor 32 (e.g., to photodetector 36). In the event that light source 34R is emitting light, but no light from light source 34R is being reflected back to photodetector 36, it can be concluded that the user's hand is not present above the right side of sensor 32.

Accordingly, by alternating back and forth between sources 34L and 34R, sensor 32 can determine whether or not a user' hand is present in the vicinity of control 34 and can, when a hand is detected, determine whether the hand that is being detected is above right light source 34R (and is therefore associated with the right user) or is above left light source 34L and is therefore associated with the left user (see, e.g., illustrative left hand LH of a left user and corresponding reflected light 38L from left light source 34L of FIG. 3). By determining whether the user's hand is above light source 34L or 34R, sensor 32 can determine whether the user is occupying left seat 24A or is occupying right seat 24B. In this way, sensor 32 may use measured hand reflections to determine whether the seat occupant who is providing input to device 30 is in the first or second seat.

In addition to detecting whether a left user's hand or right user's hand is present in the vicinity of photodetector 36, sensor 32, and controller 34, the measurements made with sensor 32 can be used to determine how quickly a user's hand is moving (e.g., by measuring the distance of the user's hand at multiple different points in time and computing a hand velocity from the measured distance and time information) and can determine the direction of hand movement (e.g., towards or away from sensor 32). During operation, control 34 (and, if desired, other components in vehicle 10) can take action based on one or more of these hand measurements (e.g., based on measured hand velocity information and/or measured hand movement direction information). For example, action can be taken based on whether or not a user's hand is present within the vicinity of photodetector 36, sensor 32, and/or control 34 (e.g., measured hand presence), action can be taken based in measured hand distance (e.g., the measured distance between a user's hand and photodetector 36, sensor 32, and/or control 34), and/or action can be taken based on measured hand velocity (e.g., the measured speed at which a user's hand is approaching photodetector 36, sensor 32, and/or control 34) and/or hand movement direction.

Examples of actions that can be taken based on hand presence, hand distance, hand movement direction, and/or hand velocity include adjusting the illumination of a light-emitting device associated with control 34 and/or other light-emitting circuitry, providing audio output from a speaker, providing haptic output, moving a movable portion of control 34, adjusting which functions of vehicle 10 are controlled by the user input provided to control 34, and/or other adjustments to the operation of control 34 and/or other components in vehicle 10.

Figure 4:
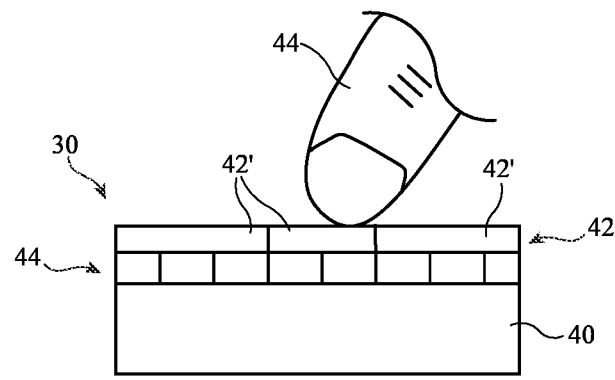
FIG. 4 is a side view of an illustrative touch screen input device in accordance with an embodiment.
Figure 5:
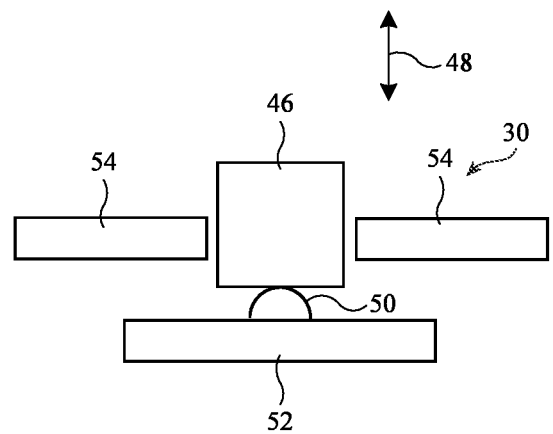
FIG. 5 is a side view of an illustrative button input device in accordance with an embodiment.
Figure 6:
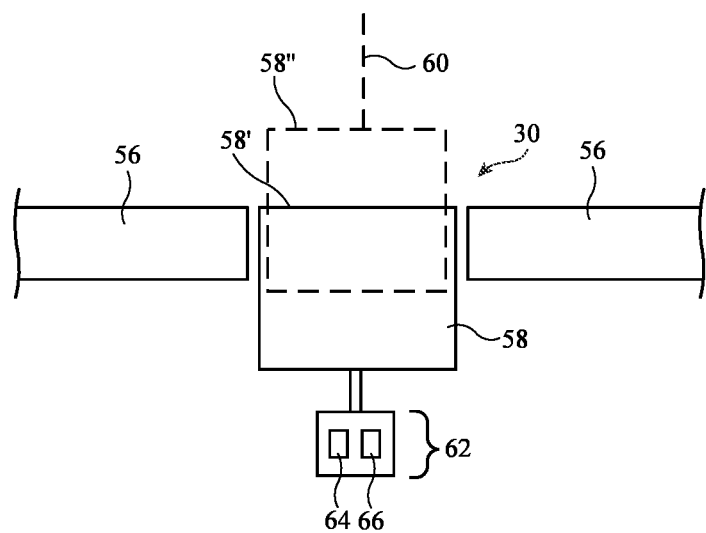
FIG. 6 is a side view of an illustrative deployable input device such as a deployable rotary knob in accordance with an embodiment.

FIGS. 4, 5, and 6 are cross-sectional side views of illustrative user input devices that may be incorporated into control 34. These input devices may, if desired, supply haptic output, visual output (images, illumination, etc.), and/or audio output.

In the example of FIG. 4, device 30 has a touch sensor such as touch sensor 42. Touch sensor 42 may be a capacitive touch sensor, an optical touch sensor, a resistive touch sensor, a sensor that detects touch using a strain gauge (e.g., a force-sensitive button), and/or other sensor that detects contact between a user's finger (e.g., finger 44) and device 30. In the example of FIG. 4, sensor 42 is a capacitive touch sensor having one or more capacitive touch sensor electrodes 42' for detecting changes in capacitance due to the presence or absence of finger 44. In configurations in which there is a single electrode 42', sensor 42 can detect finger press input. In configurations in which there are multiple electrodes 42' (e.g., a two-dimensional array of electrodes 42'), sensor 42 can detect touch gestures (e.g., swipes, pinches, taps, etc.) and/or can be used to move a cursor or otherwise serve as a two-dimensional touch input device. Sensor 42 may optionally overlap light-emitting circuitry. For example, sensor 42 may overlap a light-emitting diode, a display formed from an array of light-emitting diodes such as organic light-emitting diodes, may overlap a pixel array formed from liquid crystal display pixels, and/or may overlap other pixel arrays (see, e.g., light-emitting circuitry 44, which may be a pixel array or other light source supported on support structure 40). Configurations in which touch sensor electrodes for sensor 42 are incorporate into an organic light-emitting diode display or other array of pixels may be used, if desired.

In the example of FIG. 5, device 30 is a button having a movable button member such as movable button member 46. Button member 46 may move up and down along directions 48 within an opening in structure 54 (sometimes referred to as a support structure or support). Switch 50 (e.g., a tactile switch or dome switch) may be mounted between support structures 52 (e.g., a printed circuit) and button member 46. When a user presses on button member 46, switch 50 may detect movement of button member 46 (e.g., switch 50 may open or close). In this way, user button press input may be gathered.

Another illustrative configuration for device 30 is shown in FIG. 6. In the example of FIG. 6, device 30 has a knob or button formed from movable member 58. Member 58, which may sometimes be referred to as a movable dial, movable circular knob structure, movable disk, movable user input disk, rotatable disk, movable rotatable disk, rotatable movable disk, etc., may move in and out of an opening in support structure 56 (sometimes referred to as a support) along axis 60. For example, member 58 may move between a flush position (sometimes referred to as a stowed position) such as position 58' in which the exposed surface of member 58 lies flush with the exposed surface of support structure 56 and a proud position such as position 58" (sometimes referred to as a deployed position) in which the exposed surface of member 58 is proud of the exposed surface of structure 56 and therefore lies in a plane above the surface of support structure 56. Support structure 56 (and, if desired, structure 40 of FIG. 4 and structures 54 and 52 of FIG. 5) may be attached to the interior of body 12 and/or may include portions of body 12.

During operation of controller (control) 34, member 30 of FIG. 6 may be used to gather user input. For example, when member 58 is in deployed position 58", a user grasp the sides of member 58. System 62 may be coupled to member 58 and may include input-output components such as actuator 64 (e.g., one or more motors, linear electromagnetic actuators, etc.) and sensor 66. Actuator 64 may be used to move member 58 outwardly along axis 60 (e.g., to move member 58 from its stowed position to its deployed position) and may be used to retract member 58 inwardly along axis 60 (e.g., to move member 58 from its deployed position to its stowed position). Actuator 64 may also be used to provide rotational force (torque) about axis 60 (e.g., to implement force feedback and thereby provide features such as rotational stops and rotational detents). Sensor 66 may include a sensor that detects the downward pressure (finger press input) on the exposed surface of member 58 and that detects rotational position of member 58 about axis 60. For example, sensor 66 may include a force sensor that detects force along axis 60 and may include may include a rotational sensor (sometimes referred to as a rotation sensor) based on a rotational encoder and/or rotational sensor circuitry incorporated into a force feedback motor. This allows member 58 to serve as a knob that rotates about axis 60 (which serves as a rotational axis for the knob). The user may use rotation of member 58 to move an on-screen highlight (e.g., a cursor, highlight region, etc.) on a display in vehicle 10. Rotation of member 58 may also be used to adjust audio volume, to adjust screen brightness, to tune a radio, to adjust a seat position, to change a fan speed or temperature setting, etc.

User input to select a highlighted option (e.g., a highlighted destination in a list of possible destinations for vehicle 10, a highlighted media item in a list of media items, etc.) by pressing on member 58 (to provide finger press input detected by system 62), squeezing member 58, pushing member 58 laterally (which can be sensed by system 62), and/or otherwise interacting with member 58 in a non-rotating fashion. In an illustrative configuration, the user may make a selection of a highlighted on-screen option by pressing inwardly on member 58 (e.g., sensor 66 may include a button press sensor such as a force sensor or other sensor that detects inward force along axis 60). If desired, member 58 may include a touch sensor such as touch sensor 42 of FIG. 4 on its outer (top) surface and/or side surfaces, and/or may include a force sensor or button on its outer surface and/or side surfaces.

Figure 7:
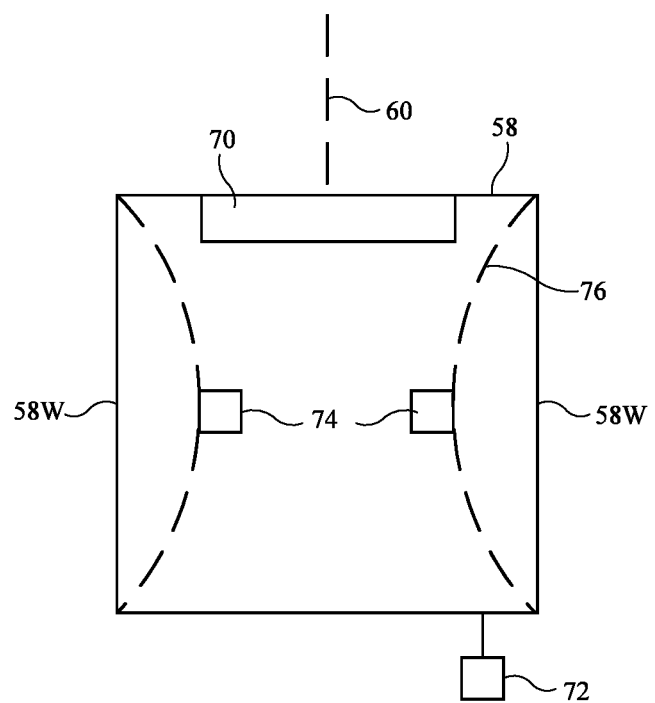
FIG. 7 is a side view of an illustrative knob of the type that may have one or more sensors for gathering user input in accordance with an embodiment.

Arrangements such as these are illustrated in the cross-sectional side view of member 58 of FIG. 7. As shown in FIG. 7, member 58 may have a sensor such as sensor 70 on its outer (top) surface, may have a sensor that detects inward movement along axis 60 (see, e.g., sensor 72, which may form part of sensor 66), and/or may have a sensor such as ring-shaped force sensor 74 that can detect when member sidewalls 58W are squeezed inwardly (e.g., to inwardly deformed position 76). With sensor circuitry such as the illustrative sensor circuitry of FIG. 7, member 58 may receive button press input (downward force detected by sensor 72), touch input (a finger touch that contacts sensor 70), tilting input (when pressed laterally in a way that is detected by sensor 66 of FIG. 6), and/or squeezing input (an inward squeeze that deforms sidewalls 58W towards position 76 of FIG. 7). If desired, other types of sensor (e.g., optical sensors, etc.) may be used by member 58 to gather user input (finger press input, touch input, squeeze input, lateral force input, etc.). The sensors of FIG. 7 are illustrative.

Figure 8:
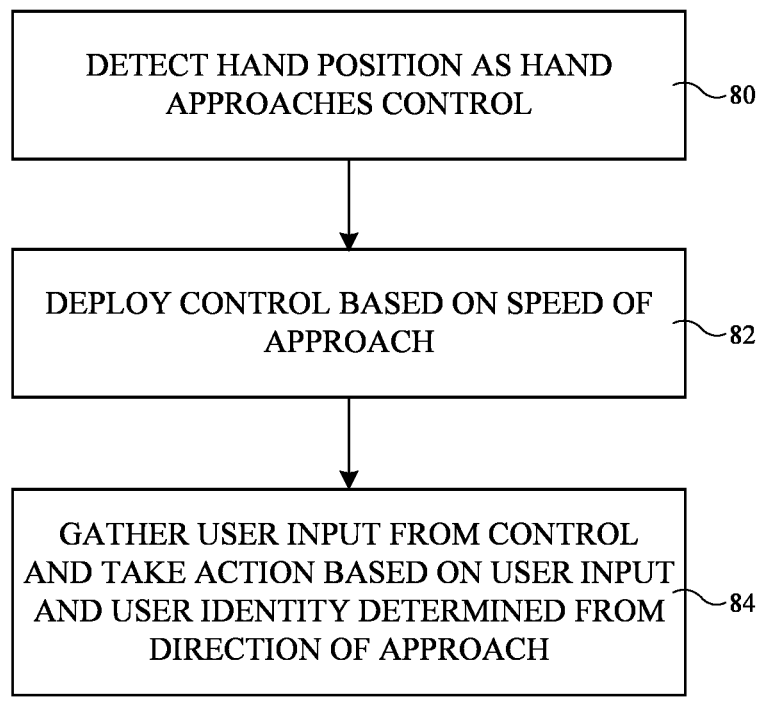
FIG. 8 is a flow chart of illustrative operations associated with using a controller in accordance with an embodiment.

FIG. 8 is a flow chart of illustrative operations involved in operating vehicle 10 and control 34. During the operations of block 80, sensor 32 may monitor for the presence of a hand of a user. For example, sensor 32 may alternate between emitting infrared light from light source 34R and light source 34L (and, if desired, additional light sources) while monitoring for reflected light at photodetector 36 (and, if desired, one or more additional photodetectors to provide additional spatial resolution). When reflected light is detected, the current location of the user's hand can be determined and the current user (seat occupant) can be identified. For example, it can be determined whether a left user's hand or right user's hand is present, thereby allowing the current user (e.g., the left user or right user) to be identified. Repeated measurements with sensor 32 during the operations of block 80 can reveal the direction of movement of the detected hand and the speed (velocity) of hand movement. For example, it may be determined that the detected hand will reach member 58 quickly (e.g., in 0.2 seconds as an example) or slowly (e.g., in 2 seconds as an example). Information on user hand identity, position, direction of movement, and/or speed (e.g., velocity towards member 58 or other portion of device 30) may then be used in taking suitable action.

As an example, during the operations of block 82, actuator 64 may move member 58 of device 30 of FIG. 6 from its stowed position to its deployed position. The deployment of member 58 in this way may be performed in response to detection of the presence of the user's hand and/or detection that the user's hand is moving towards member 58. If desired, actuator 64 may move member 58 from position 58' towards position 58" at a speed that is chosen based on the measured speed of the user's hand towards member 58 that is measured with sensor 32. In this way, member 58 may be deployed just before the user's hand reaches member 58. If, as an example, it is determined from the measured speed of the user's hand that the user's hand will reach member 58 in 0.2 seconds, member 58 may be deployed at a speed that ensures that member 58 will be fully deployed in 0.1 seconds. If, however, it is determined from the measured speed of the user's hand that the user's hand will reach member 58 in 2 seconds, member 58 may be deployed at a sped that ensures that member 58 will be fully deployed in 1.9 seconds. By using a hand-velocity-dependent deployment speed in deploying member 58, device 30 can be deployed sufficiently rapidly to ensure that device 30 will be ready for use by the user, without being deployed overly rapidly (which might not be aesthetically pleasing to the user).

If desired, device 30 may be deployed at a constant speed rather than a hand-velocity-dependent speed or may always be deployed. The use of a hand-velocity-dependent speed in deploying member 58 is illustrative.

During the operations of block 84, controller 34 may use device 30 to gather user input (e.g., finger press input, finger touch input, knob rotation input, knob squeeze input, etc.) and can take suitable action. Because sensor 32 determines whether the left or right user is supplying input to device 30, the actions that are taken in vehicle 10 in response to user input gathered with controller 34 can be based on the user's identity (e.g., the user's identity determined by the side of sensor 32 on which the user's hand was detected and/or the path along which the user's hand traveled to reach member 58). Examples of user-specific (seat-specific) actions that can be taken include adjusting a seat parameter (seat height, seat tilt, seat heating and cooling, seat massaging on/off, etc.) for the current user's seat (without adjusting the seats of other users), adjusting user-specific playback volume levels and/or other user-specific audio settings, using a display to present interactive users-specific lists such as user-specific media lists, user-specific message lists, user-specific destination lists, adjusting user-specific lights, adjusting user-specific windows, adjusting user-specific climate systems, and/or controlling other user-specific devices operating in vehicle 10.

During use of vehicle 10, information on users of vehicle 10 may be gathered. This information may include name information, biometric information, and/or other personal information. Best practices are preferably used to safeguard this information and protect user privacy. Such best practices may involve opt in procedures and opt out procedures and other procedures that help ensure that users can control their personal information and that help ensure that all applicable regulations are satisfied.

The foregoing is merely illustrative and various modifications can be made to the described embodiments. The foregoing embodiments may be implemented individually or in any combination.

What is claimed is:

1. A system, comprising:
   first and second seats;
   a knob that is configured to gather user input from a seat occupant located in one of the first and second seats; and
   a sensor having a photodetector that is configured to measure hand reflections of infrared light as the knob is gathering the user input from the seat occupant, wherein the sensor is configured to use the measured hand reflections to determine whether the seat occupant is a) in the first seat and not in the second seat or b) is in second seat and not in the first seat.

2. The system defined in claim 1 wherein the sensor comprises first and second infrared light sources and wherein the infrared light is emitted by the first and second infrared light sources.

3. The system defined in claim 2 wherein the knob is configured to rotate.

4. The system defined in claim 3 wherein the knob comprises a disk configured to move between a stowed position and a deployed position.

5. The system defined in claim 4 further comprising a body having an interior region, the system further comprising a support in the interior region that has an opening and that has an exposed surface that faces the interior region, wherein the disk comprises a rotatable disk that moves within the opening.

6. The system defined in claim 5 wherein the knob further comprises an actuator configured to move the rotatable disk.

7. The system defined in claim 6 wherein the rotatable disk comprises an outer surface, and wherein the actuator is configured to move the rotatable disk between the stowed position in which the outer surface is flush with the exposed surface and the deployed position in which the outer surface is proud of the exposed surface.

8. The system defined in claim 1 further comprising a vehicle body having an interior region, wherein the first and second seats are in the interior region and wherein the sensor comprises an infrared sensor.

9. The system defined in claim 8 wherein the infrared sensor comprises first and second infrared light sources, wherein the infrared light is emitted by the first and second infrared light sources, wherein the first infrared light source is off whenever the second infrared light source is on, and wherein the second infrared light source is off whenever the first infrared light source is on.

10. The system defined in claim 9 wherein the knob is located between the first and second infrared light sources.

11. The system defined in claim 1 wherein the sensor comprises an infrared sensor configured to measure hand velocity.

12. The system defined in claim 11 wherein the knob has a rotation sensor configured to gather knob rotation input.

13. The system defined in claim 12 further comprising a squeeze sensor on the knob that is configured to gather user knob squeezing input.

14. The system defined in claim 12 further comprising a touch sensor on the knob that is configured to gather user touch input.

15. The system defined in claim 12 further comprising an additional sensor coupled to the knob that is configured to gather finger press input.

16. A controller, comprising:
    a knob configured to gather knob rotation input from a user; and
    an infrared optical hand position sensor adjacent to the knob that is configured to identify a seat location of the user by measuring emitted infrared light from the infrared optical hand position sensor after reflection from a hand of the user.

17. The controller defined in claim 16 wherein the infrared optical hand position sensor comprises first and second light sources configured to emit infrared light.

18. The controller defined in claim 17 wherein the infrared optical hand position sensor comprises a photodetector that measures the emitted infrared light after reflection from the hand, wherein the first light source is turned on to emit the infrared light only when the second light source is turned off, and wherein the second light source is turned on to emit the infrared light only when the first light source is turned off.

19. A controller, comprising:
    a knob that is configured to gather knob rotation input; and
    an optical sensor adjacent to the knob, wherein the optical sensor has first and second infrared light sources and a photodetector and is configured to gather user seat location information associated with the knob rotation input.

20. The controller defined in claim 19 wherein the optical sensor is configured to use the first and second infrared light sources to alternately emit infrared light while using the photodetector to measure the infrared light after the infrared light has been reflected to produce the user seat location information, wherein the knob has a rotation sensor configured to measure rotation of the knob to gather the knob rotation input, and wherein the user seat location information identifies a vehicle seat occupant who is providing the knob rotation input.

* * * * *